(12) United States Patent
Ullmann et al.

(10) Patent No.: US 9,921,698 B2
(45) Date of Patent: Mar. 20, 2018

(54) LAYER ELECTRODE FOR TOUCHSCREENS

(71) Applicant: POLYIC GMBH & CO. KG, Fürth (DE)

(72) Inventors: Andreas Ullmann, Zirndorf (DE); Manfred Walter, Nuremberg (DE)

(73) Assignee: PolyIC GmbH & Co. KG, Furth (DE)

( * ) Notice: Subject to any disclaimer, the term of this patent is extended or adjusted under 35 U.S.C. 154(b) by 7 days.

(21) Appl. No.: 14/889,078

(22) PCT Filed: May 6, 2014

(86) PCT No.: PCT/EP2014/059263
§ 371 (c)(1),
(2) Date: Nov. 4, 2015

(87) PCT Pub. No.: WO2014/180862
PCT Pub. Date: Nov. 13, 2014

(65) Prior Publication Data
US 2016/0154517 A1    Jun. 2, 2016

(30) Foreign Application Priority Data

May 6, 2013 (DE) .......................... 10 2013 104 644

(51) Int. Cl.
*G06F 3/044* (2006.01)

(52) U.S. Cl.
CPC .................................. *G06F 3/044* (2013.01)

(58) Field of Classification Search
CPC ....................................................... G06F 3/044
See application file for complete search history.

(56) References Cited

U.S. PATENT DOCUMENTS

| | | |
|---|---|---|
| 4,304,976 A | 12/1981 | Gottbreth et al. |
| 4,659,874 A | 4/1987 | Landmeier |
| 4,879,508 A | 11/1989 | Andermo |
| 5,034,740 A | 7/1991 | Acher |
| 6,054,872 A | 4/2000 | Fudanuki et al. |
| 6,222,522 B1 | 4/2001 | Mathews et al. |

(Continued)

FOREIGN PATENT DOCUMENTS

| | | |
|---|---|---|
| CN | 101794187 A | 8/2010 |
| DE | 2910451 A1 | 9/1979 |

(Continued)

OTHER PUBLICATIONS

U.S. Appl. No. 14/889,078, Ullmann et al.

(Continued)

*Primary Examiner* — Patrick F Marinelli
(74) *Attorney, Agent, or Firm* — William Squire

(57) ABSTRACT

The invention relates to a layer electrode for touchscreens, in particular one which is suitable for the construction of capacitive touchscreens. In the case of a growing number of pixels within the layer electrode, various possibilities are proposed for reducing the loss of surface area within an outer electrode array due to the passage of supply lines to inner electrode arrays. For this it is proposed to change the shape of the electrode arrays, the shape of the galvanic isolations between the electrode arrays and finally the arrangement of the supply lines for the electrode arrays.

14 Claims, 19 Drawing Sheets

(56) References Cited

U.S. PATENT DOCUMENTS

| | | | |
|---|---|---|---|
| 8,319,747 B2* | 11/2012 | Hotelling | G06F 3/044 345/173 |
| 8,368,657 B2* | 2/2013 | Borras | G06F 3/044 178/18.01 |
| 8,633,915 B2* | 1/2014 | Hotelling | G06F 3/0416 178/18.01 |
| 9,018,536 B2 | 4/2015 | Ullmann et al. | |
| 9,182,861 B2* | 11/2015 | Bulea | G06F 3/044 |
| 9,236,862 B2 | 1/2016 | Fix et al. | |
| 9,292,138 B2* | 3/2016 | Gourevitch | G06F 3/044 |
| 9,377,914 B2* | 6/2016 | Fix | G06F 3/044 |
| 9,501,187 B2* | 11/2016 | Kim | G06F 3/044 |
| 2004/0095335 A1 | 5/2004 | Oh et al. | |
| 2006/0097991 A1* | 5/2006 | Hotelling | G06F 3/0416 345/173 |
| 2007/0242054 A1 | 10/2007 | Chang et al. | |
| 2008/0074398 A1 | 3/2008 | Wright | |
| 2008/0129312 A1 | 6/2008 | Almonte | |
| 2008/0129317 A1 | 6/2008 | Oba | |
| 2008/0238881 A1 | 10/2008 | Perski et al. | |
| 2009/0073135 A1 | 3/2009 | Cheng et al. | |
| 2009/0091551 A1* | 4/2009 | Hotelling | G06F 3/0416 345/174 |
| 2009/0267916 A1 | 10/2009 | Hotelling | |
| 2009/0284492 A1 | 11/2009 | Chino | |
| 2010/0028811 A1 | 2/2010 | Geaghan | |
| 2010/0045632 A1 | 2/2010 | Yilmaz et al. | |
| 2010/0079402 A1 | 4/2010 | Grunthaner et al. | |
| 2010/0149108 A1* | 6/2010 | Hotelling | G06F 3/044 345/173 |
| 2010/0214247 A1 | 8/2010 | Tang | |
| 2010/0253646 A1* | 10/2010 | Hiratsuka | G06F 3/044 345/174 |
| 2010/0321043 A1 | 12/2010 | Philipp | |
| 2011/0018560 A1 | 1/2011 | Kurashima | |
| 2011/0022351 A1 | 1/2011 | Philipp et al. | |
| 2011/0074609 A1 | 3/2011 | Lin | |
| 2011/0102370 A1 | 5/2011 | Son et al. | |
| 2011/0127092 A1 | 6/2011 | Lu | |
| 2011/0193800 A1 | 8/2011 | Son et al. | |
| 2012/0056664 A1 | 3/2012 | Nam | |
| 2012/0062472 A1* | 3/2012 | Yilmaz | G06F 3/041 345/173 |
| 2012/0193130 A1 | 8/2012 | Fix et al. | |
| 2012/0227259 A1 | 9/2012 | Badaye et al. | |
| 2012/0273336 A1 | 11/2012 | Kuriki | |
| 2012/0327016 A1* | 12/2012 | Hristov | G06F 3/0416 345/174 |
| 2013/0038542 A1 | 2/2013 | Kim | |
| 2013/0062179 A1 | 3/2013 | Ye et al. | |
| 2013/0093696 A1* | 4/2013 | Huang | G06F 3/044 345/173 |
| 2013/0154995 A1 | 6/2013 | Trend et al. | |
| 2013/0199915 A1 | 8/2013 | Guard | |
| 2014/0022186 A1* | 1/2014 | Hong | G06F 3/0416 345/173 |
| 2014/0110236 A1* | 4/2014 | Lee | G06F 3/044 200/5 A |
| 2014/0110239 A1* | 4/2014 | Lee | G06F 3/044 200/600 |
| 2014/0166464 A1 | 6/2014 | Fix et al. | |
| 2014/0202840 A1* | 7/2014 | Fix | G06F 3/044 200/5 A |
| 2014/0210772 A1* | 7/2014 | Yang | G06F 3/044 345/174 |
| 2014/0238728 A1 | 8/2014 | Ullmann et al. | |
| 2014/0327848 A1 | 11/2014 | Fix et al. | |
| 2014/0333858 A1* | 11/2014 | Martisauskas | G06F 1/1643 349/12 |
| 2015/0022499 A1 | 1/2015 | Trend | |
| 2015/0116265 A1* | 4/2015 | Xie | G06F 3/044 345/174 |
| 2015/0145817 A1* | 5/2015 | Chang | G06F 3/044 345/174 |
| 2015/0268795 A1* | 9/2015 | Kurasawa | G06F 3/0418 345/174 |
| 2015/0378474 A1* | 12/2015 | Liu | G06F 3/0412 345/174 |
| 2016/0070394 A1* | 3/2016 | Van Ostrand | G06F 3/047 345/173 |
| 2016/0098113 A1* | 4/2016 | Ding | G02F 1/1333 345/174 |
| 2016/0154517 A1* | 6/2016 | Ullmann | G06F 3/044 345/173 |

FOREIGN PATENT DOCUMENTS

| | | |
|---|---|---|
| DE | 30 04461 A1 | 8/1981 |
| DE | 3149722 A1 | 9/1982 |
| DE | 102004026672 A1 | 12/2005 |
| DE | 202006010488 U1 | 12/2006 |
| DE | 102005041114 A1 | 3/2007 |
| DE | 202006014244 U1 | 3/2007 |
| DE | 20 2006 018448 | 4/2007 |
| DE | 202007007345 | 12/2007 |
| DE | 2006001245 T5 | 3/2008 |
| DE | 102008003022 | 7/2009 |
| DE | 102009017418 A1 | 10/2009 |
| DE | 112008000906 T5 | 4/2010 |
| DE | 20 2009 017952 U1 | 10/2010 |
| DE | 102009014757 A1 | 10/2010 |
| DE | 102009058138 A1 | 6/2011 |
| DE | 102011082556 A1 | 3/2012 |
| DE | 202012103338 U1 | 11/2012 |
| DE | 202012101480 U1 | 12/2012 |
| DE | 102011108153 A1 | 1/2013 |
| DE | 102011108803 A1 | 1/2013 |
| DE | 102011120654 B3 | 6/2013 |
| DE | 102012112445 A1 | 6/2014 |
| EP | 0609021 A2 | 8/1994 |
| EP | 1211632 A2 | 6/2002 |
| EP | 2045698 A2 | 4/2009 |
| EP | 2065794 A1 | 6/2009 |
| EP | 2405328 A2 | 3/2010 |
| EP | 2405329 A2 | 3/2010 |
| EP | 2290512 A2 | 3/2011 |
| GB | 2090979 | 7/1982 |
| GB | 2439614 B | 12/2008 |
| GB | 2469386 B | 10/2010 |
| JP | H02-001263 | 1/1990 |
| JP | H10-312715 | 11/1998 |
| RU | 2029353 | 2/1995 |
| RU | 61899 U1 | 3/2007 |
| WO | WO2005114369 A2 | 12/2005 |
| WO | WO2012/057027 A1 | 5/2012 |
| WO | WO2012/115685 A1 | 8/2012 |
| WO | WO2013/038624 A1 | 3/2013 |
| WO | WO2013038624 | 3/2013 |

OTHER PUBLICATIONS

Designlosungen mit gesteigerter Functionalitat, Ehrig et al., Design and Marketing, Swiss Plastics, pp. 16-20,Jun. 2011 U.S. Appl. No. 14/233,250, filed Jan. 16, 2014.

Touchskin-nicht touchscreen p. 30, Reinhard Bauer, Plastvarbeiter Dec. 2010 U.S. Appl. No. 14/233,250, filed Jan. 16, 2014.

International Search reports this applicatiion and related application.

Examination reports in corresponding German application and related application.

* cited by examiner

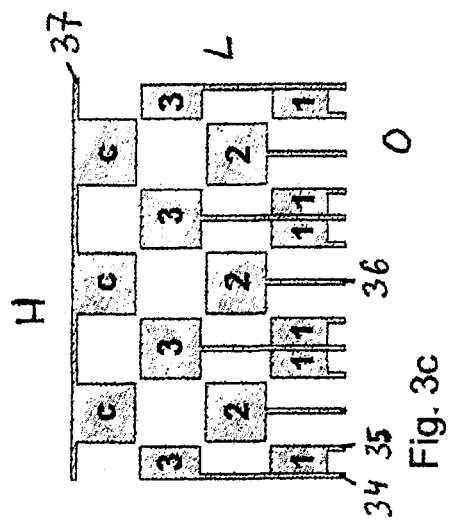
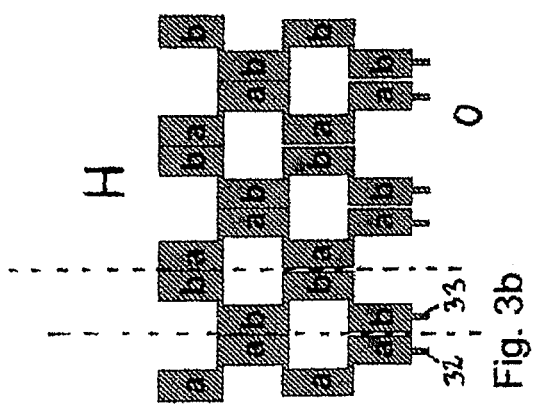
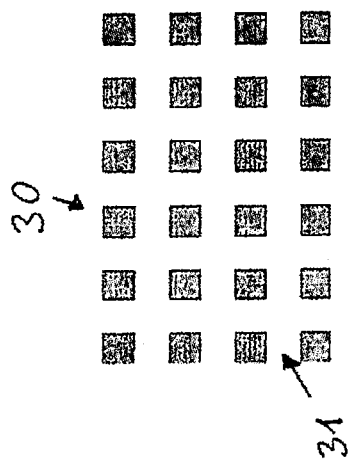
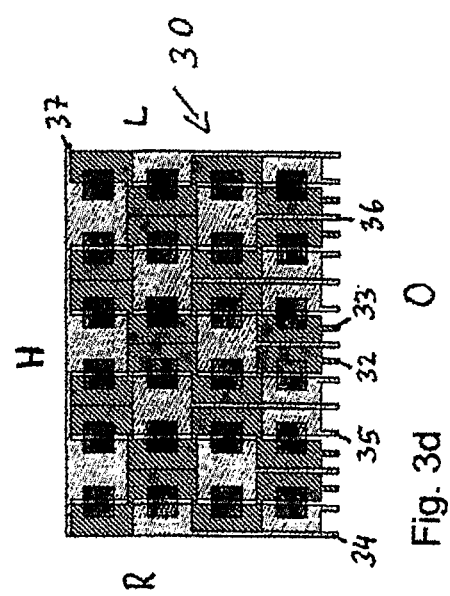
Fig. 3a  Fig. 3b  Fig. 3c  Fig. 3d
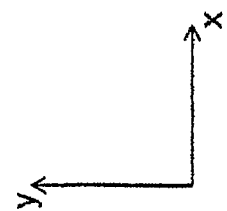

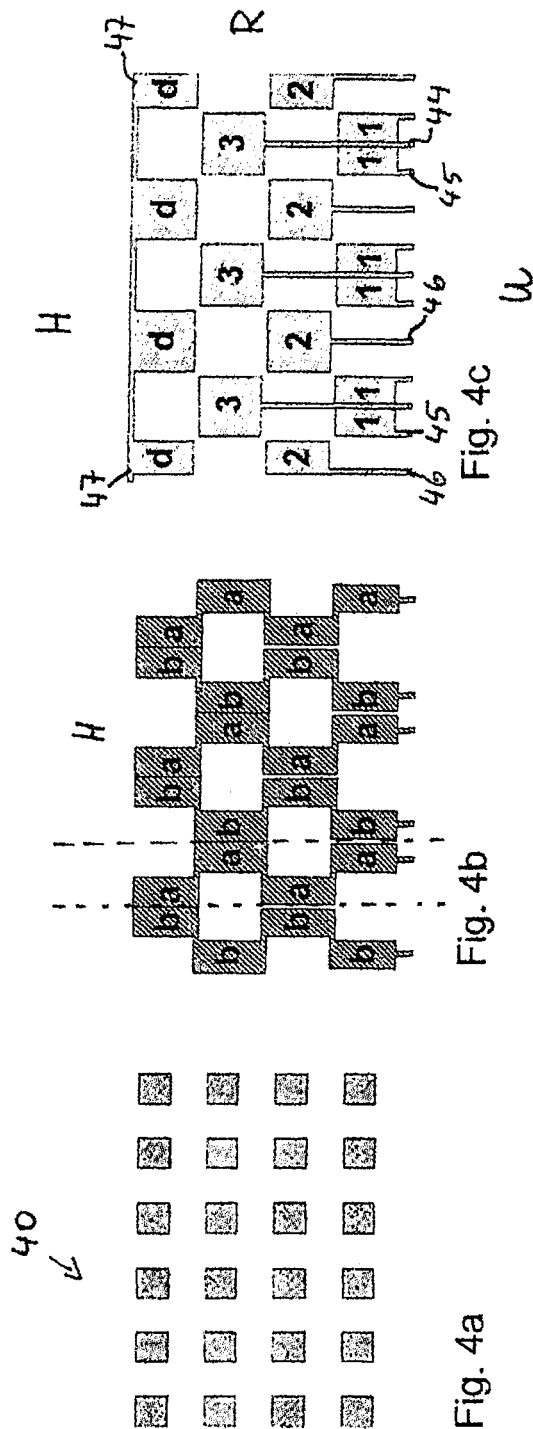
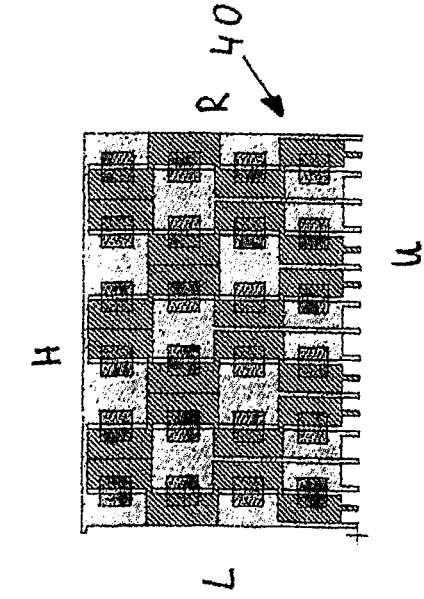
Fig. 4a
Fig. 4b
Fig. 4c
Fig. 4d

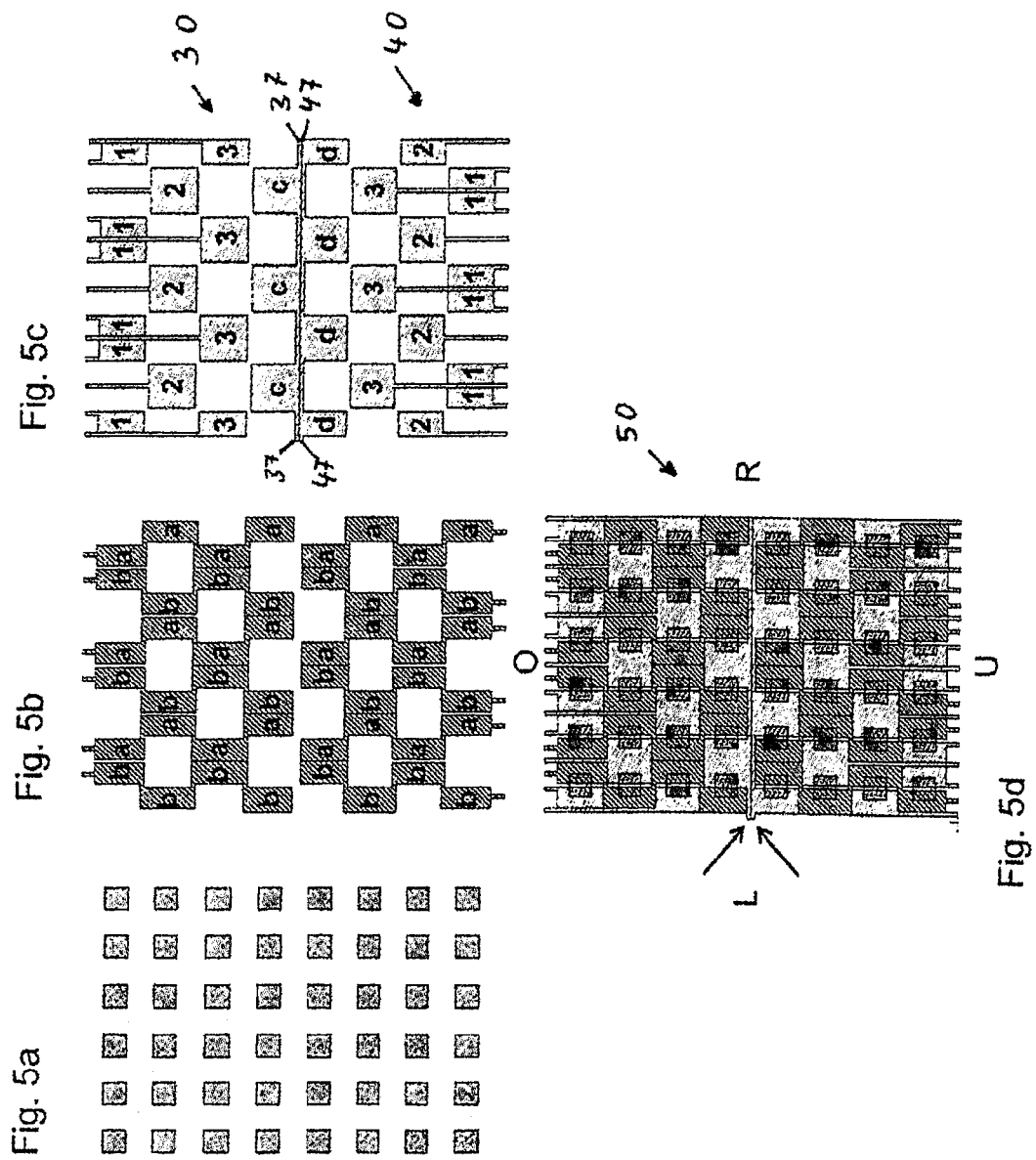

LAYER ELECTRODE FOR TOUCHSCREENS

The invention relates to a layer electrode for touchscreens, in particular one which is suitable for the construction of capacitive touchscreens.

Such layer electrodes routinely comprise a first and second conductive region of receiver electrodes, which are adjacent to each other and on one plane but are spaced apart from each other by galvanic isolations, and a conductive region of transmitter electrodes, which are also adjacent to each other and on one plane but are spaced apart from each other by galvanic isolations. A layer electrode is characterized in that both electrical functionalities, the receiver functionality on the one hand and the transmitter functionality on the other hand, are realized on the surface of a substrate in one plane. The respective electrode arrays cover the entire usable surface of the touchscreen and can be contacted by supply lines which, bundled, are routed to corresponding control electronics. The usable surface of the touchscreen is correspondingly divided into an active electrode array surface, which corresponds to the surface which is covered with transmitter and receiver electrode arrays, and an inactive surface, which is covered with the respective supply lines for the electrode surfaces and galvanic isolations between conductive regions.

A disadvantage of the arrangements known to date of electrode arrays on layer electrodes is their high susceptibility to interfering signals in the edge region which are triggered by supply lines, in particular by bundles of supply lines.

The object of the present invention is therefore to overcome the disadvantages of the state of the art and to create an arrangement of electrode arrays on a layer electrode in which the number of interfering signals in the edge region is reduced.

This object is achieved by the arrangements of the receiver and transmitter electrode arrays and the supply lines thereof on a layer electrode shown in the present case in the claims, the description and the figures.

Since the supply lines of all electrode arrays in the bundle are galvanically isolated from each other, the inactive surface which is covered with supply lines is no longer negligible in the case of larger touchscreens with correspondingly higher numbers of electrode arrays but develops into an interference factor as the size of the screen increases, above all in the edge region.

It therefore makes sense to create an arrangement of receiver and transmitter electrode arrays on a layer electrode which functions with as little loss of surface area as possible due to coverage with supply lines on the usable surface of the touchscreen.

In particular, the ratio of active to inactive surface on the usable surface in the case of large touchscreens with a high number of receiver and transmitter electrodes should be shifted by the arrangement of the electrode arrays to the benefit of the size of the active surface compared with the known arrangements.

A general discovery of the inventor is that there are arrangements or layouts for a layer electrode for a touchscreen which distribute the contacting of the supply lines over the entire edge region of the layer electrode, wherein the distribution can also consist in only one further contacting being provided on a further side of the layer electrode in addition to the usual contacting along a side at the top and/or the bottom.

The subject-matter of the present invention is thus a layer electrode for a touchscreen having four corners and correspondingly also four sides, wherein in each case two sides lie opposite each other and thereby, within the layer electrode, in each case predetermine parallel rows and columns for two opposite sides, wherein, on a transparent substrate, the layer electrode has a usable surface which is divided into an active surface, i.e. covered with electrode arrays, and an inactive surface, i.e. covered with supply lines or galvanic isolations between the electrode arrays or the supply lines, wherein the ratio of active to inactive surface in the edge region, i.e. in the outermost columns and in the outermost rows, is at least 1, but advantageously greater than 1, and the arrangement of the electrode arrays, the supply lines and/or the galvanic isolations in-between is chosen such that, in addition to the contacting of the supply lines on one side of the usable surface, there is provided a contacting on at least one further side and in particular a contacting on two further sides of the usable surface of the layer electrode.

The electrode arrays are conductive transparent regions of the usable surface on the touchscreen.

In particular, the electrode arrays are receiver or transmitter electrode arrays such as are also found in the embodiments which are explained in more detail in the figures.

The layer electrode according to the present invention is preferably an electrode for a touchscreen formed in one plane in which all of the electrode arrays, i.e. both receiver and transmitter electrode arrays, for the functionality of the touch sensor technology are realized in one plane.

Preferably, a layer electrode comprises a transparent carrier which is covered with electrically conductive arrays which form, on the one hand, transmitter electrode arrays and, on the other hand, receiver electrode arrays, which are therefore electrically isolated from each other but are arranged adjacent to each other on the one surface which forms the surface of the transparent carrier.

In the present case, an electrode for use in a touchscreen which is formed in a single layer is called a layer electrode.

The layer electrode preferably forms a capacitive touch sensor array in which receiver and transmitter electrodes are arranged on one surface.

The layer electrode is preferably a capacitive touch sensor, wherein the electrode arrays are arranged in a single electrically conductive layer.

The electrodes of the touch sensor are divided into receiver and transmitter electrodes which, in the present case, are depicted as a layer electrode, i.e. in one plane.

In contrast to the electrodes with two or more layers for capacitively and/or resistively coupling touch sensors, in which two planes are provided for two electrical functionalities, in the present case, although two electrical functionalities (receiver and transmitter functionality) which are isolated from each other are realized in the transparent touch sensor, this is not on two planes but on one plane, as a layer electrode.

For this, the receiver and transmitter electrodes on the transparent carrier are present separated only by galvanic isolation, for example cuts or slits.

The surface which is covered by the arrangement of the electrodes and/or supply lines is to have as high a degree of transparency as possible, for which reason electrode materials such as ITO and/or the conductive transparent films known from our own application DE 10 2009 014 757.8 are preferred electrode materials here. The disclosure contained in DE 10 2009 014 757.8 is named herewith in its entirety as the subject-matter of the present application. In particular, reference is made herewith to the size dimensions specified there for the conductor traces, conductor trace segments and spacings for galvanic isolations, as well as the layer thickness, the diameter of the conductor traces and the surface coverage of the transparent carrier with conductor traces to achieve a sufficient conductivity.

The surface coverage of the transparent film with conductor traces is in the range of 1 to 20% and particularly preferably in the range of from 5 to 10%.

The layer electrode produces, by means of the transmitter and receiver arrays, a matrix of pixels which serve as input element for the touchscreen. The more complex the input element is designed, the higher the number of pixels in the matrix. In addition to the usable surface which forms the matrix, the layer electrode also comprises the contact surface, i.e. an edge region around the usable surface at which the supply lines and contacts for the individual sensor arrays are bundled and contacted. This edge region of the layer electrode does not have to be transparent.

According to an advantageous embodiment, the usable surface of the layer electrode comprises a matrix with pixels, for example 7×6 pixels, 8×6 pixels, or 7×12 pixels, or 8×12 pixels or 10×16 pixels or even 16×25 or more pixels.

In principle, a pixel corresponds to the intersection of a row with a column.

Advantageously, at least some of the supply lines of the receiver and/or transmitter electrode surfaces of the layer electrode lying inside the usable surface of the layer electrode are displaced such that the supply lines in each case are displaced along the shortest route between the position of the respective electrode surface and the closest side of the usable surface of the layer electrode.

The invention is explained in more detail in the following with reference to figures which show selected embodiment examples:

FIG. 3a shows a 4×6 pixel matrix on which an input element of the touchscreen is based.

FIG. 3b shows a coverage with receiver electrode arrays in order to realize the pixel matrix according to FIG. 3a.

FIG. 3c shows a coverage with transmitter electrode arrays in order to realize the pixel matrix according to FIG. 3a.

FIG. 3d shows a resulting half of a layer electrode composed of the partial views according to FIGS. 3a to 3c.

FIG. 4a shows a 4×6 pixel matrix,

FIG. 4b shows a coverage with receiver electrode arrays in order to realize the pixel matrix according to FIG. 4a.

FIG. 4c shows a coverage with transmitter electrode arrays in order to realize the pixel matrix according to FIG. 4a, and FIG. 4d, analogously to FIG. 3d, shows a resulting half of a layer electrode assembled from the partial views according to FIGS. 4a to 4c.

FIG. 5a shows a pixel matrix of 6×8 pixels,

FIG. 5b shows the distribution of the receiver electrode arrays on a layer electrode for 6×8 pixels, FIG. 5c shows the distribution of the transmitter electrode arrays on a layer electrode for 6×8 pixels and FIG. 5d, analogously to FIGS. 4d and 3d, shows the assembled layer electrode.

Figure 6C:
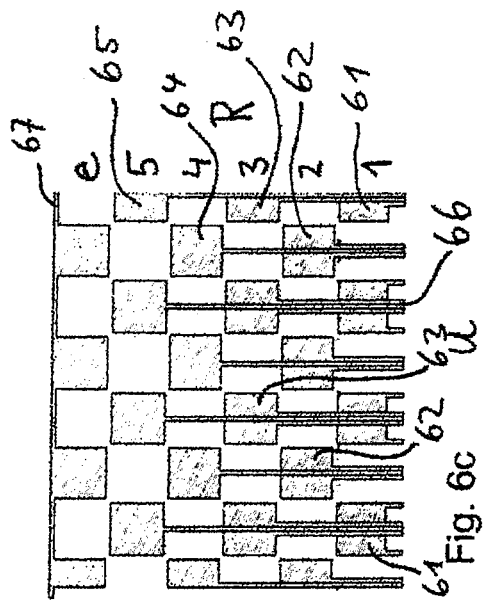
Figure 6B:
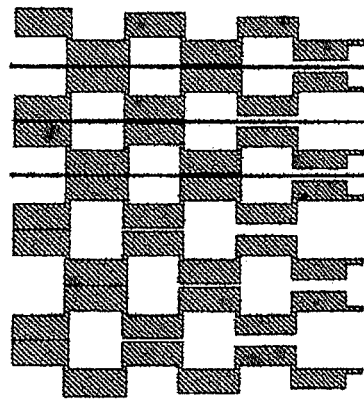
Figure 6D:
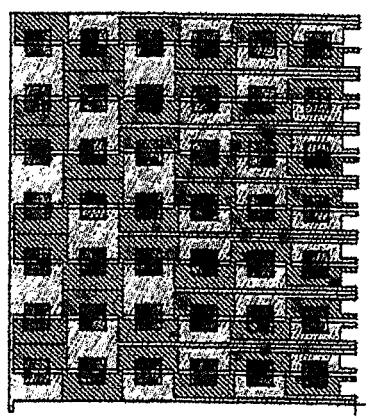
Figure 6A:
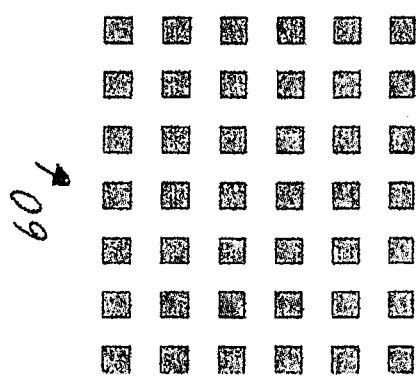

FIG. 6a again shows a pixel matrix with 7×6 pixels and FIGS. 6b to 6d correspondingly show the receiver and transmitter electrodes with the overall picture of the layer electrode.

FIGS. 7a to 7d correspondingly show the merging of the representations of the layer electrode halves from FIGS. 6a to 6d.

FIGS. 8a to 8d show a matrix with 8×6 pixels as well as the corresponding representations of the layer electrode halves with supply lines, FIGS. 9a to 9d correspondingly show the merging of the two halves from FIG. 8.

Figure 10B:
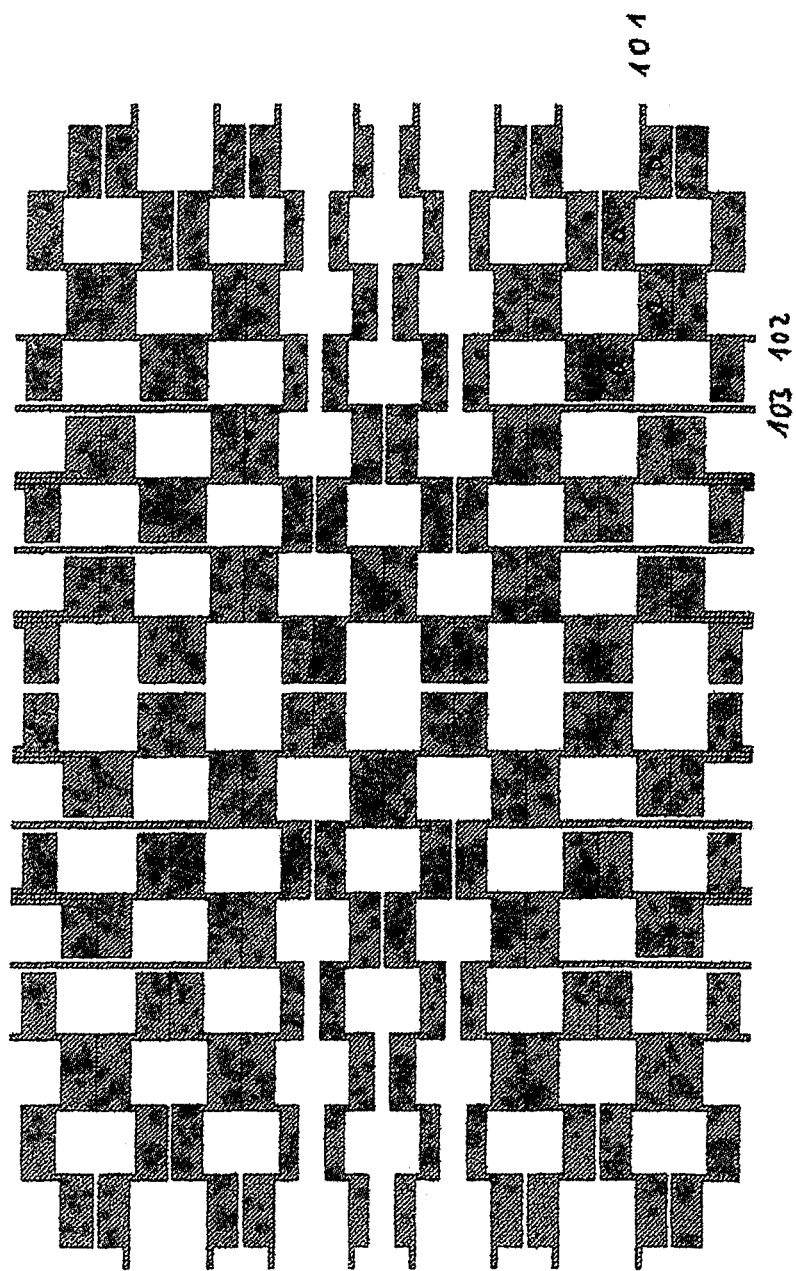
Figure 10C:
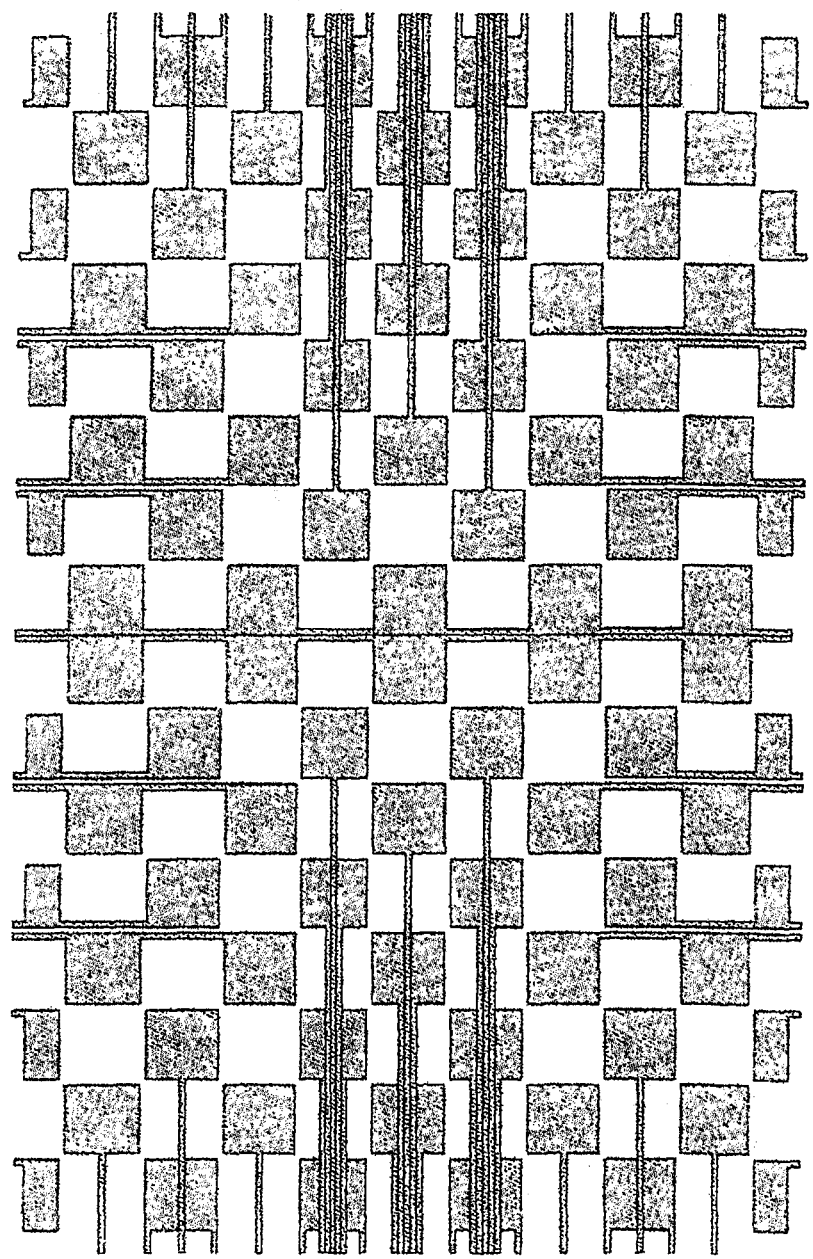
Figure 10D:
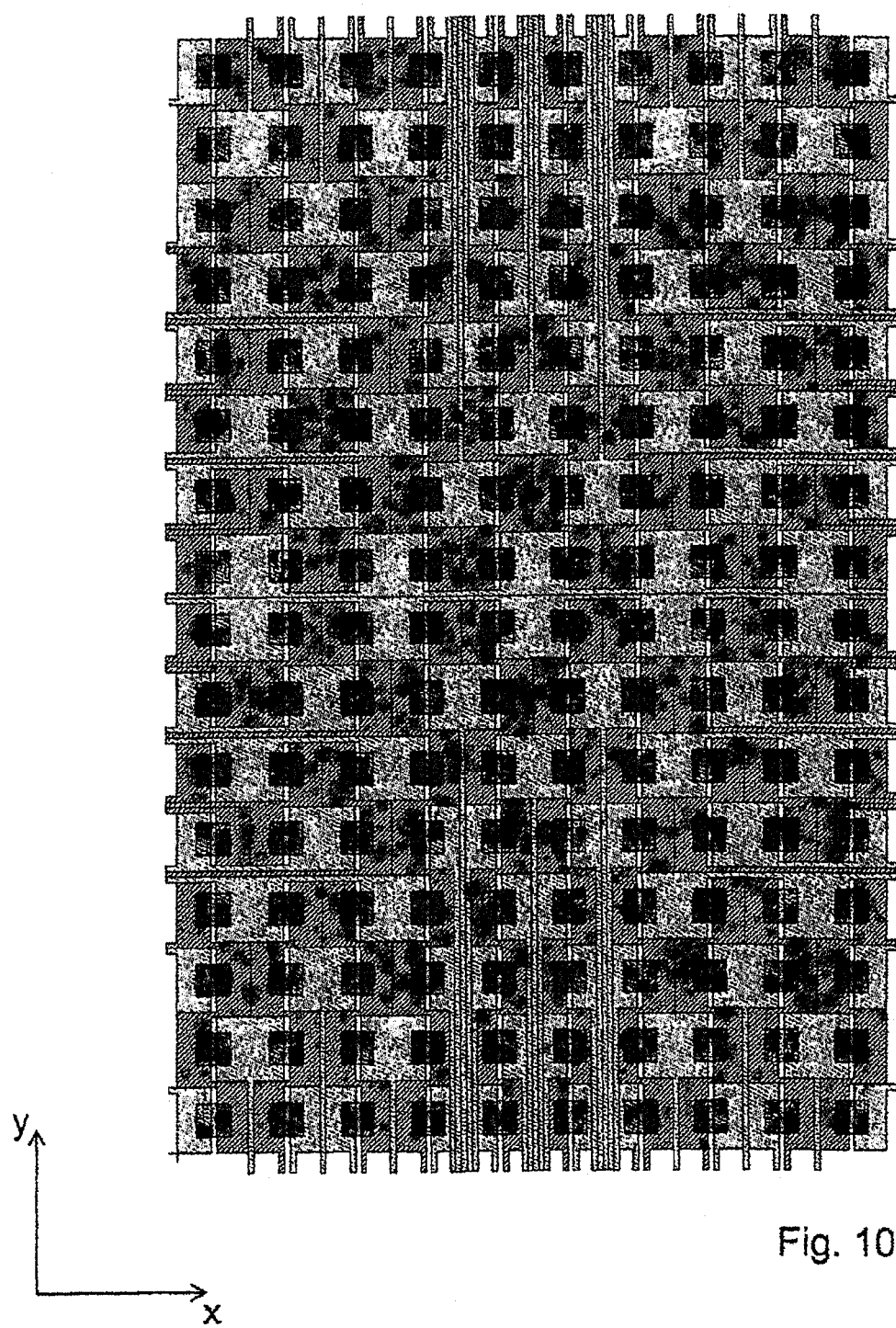

FIGS. 10b to 10d show corresponding representations of an embodiment of a layer electrode with 16×10 pixels.

Figure 11B:
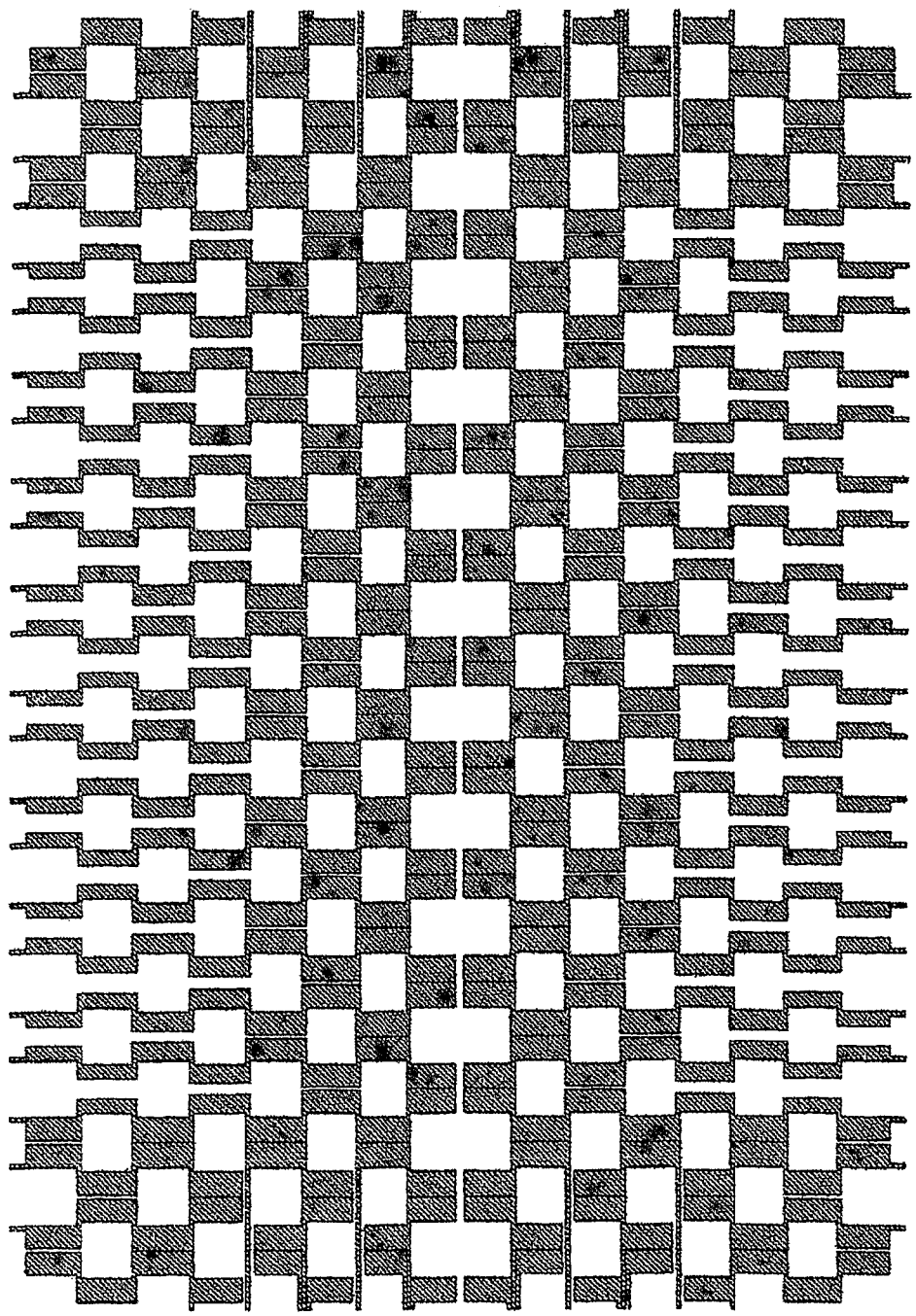
Figure 11C:
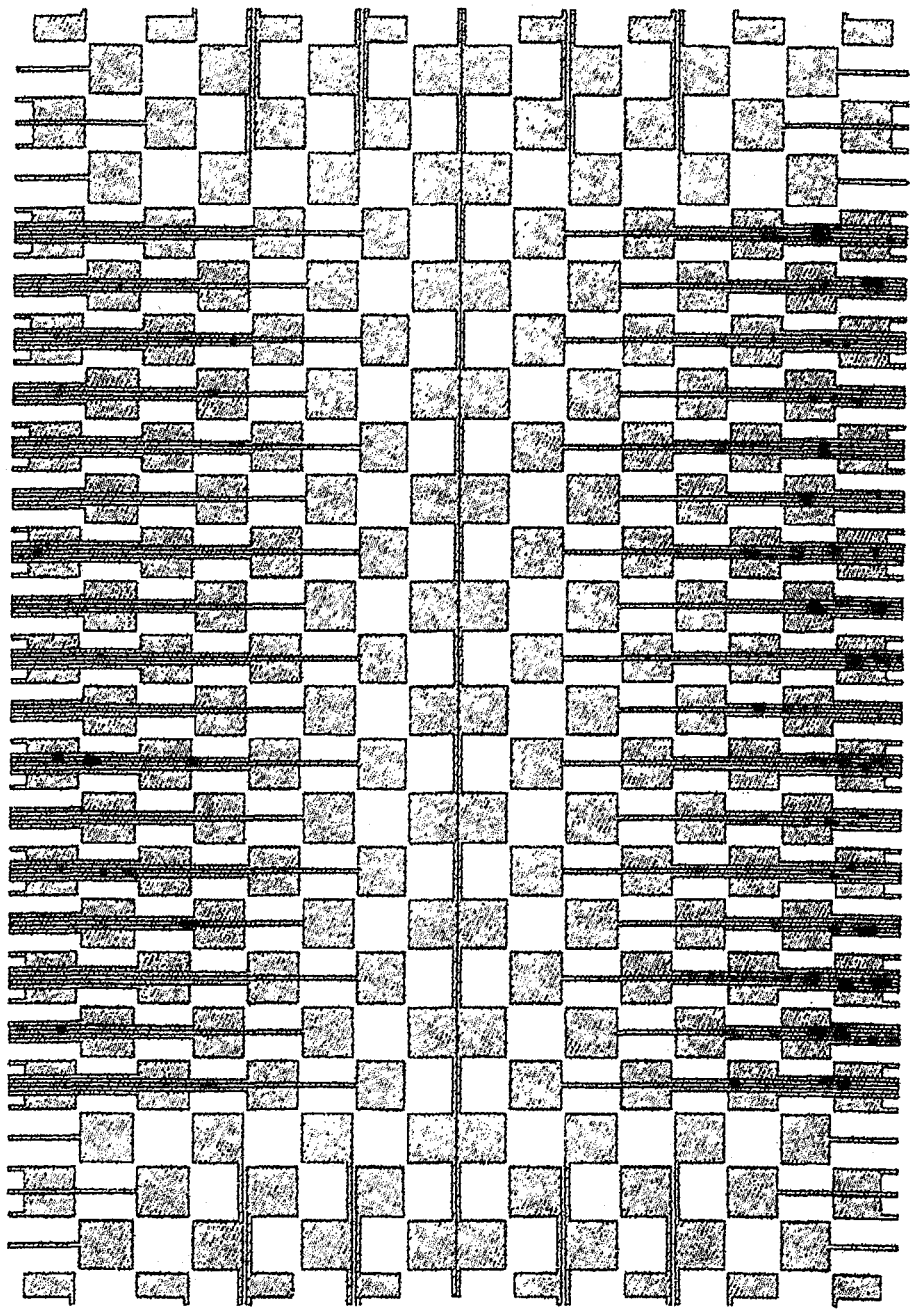
Figure 11D:
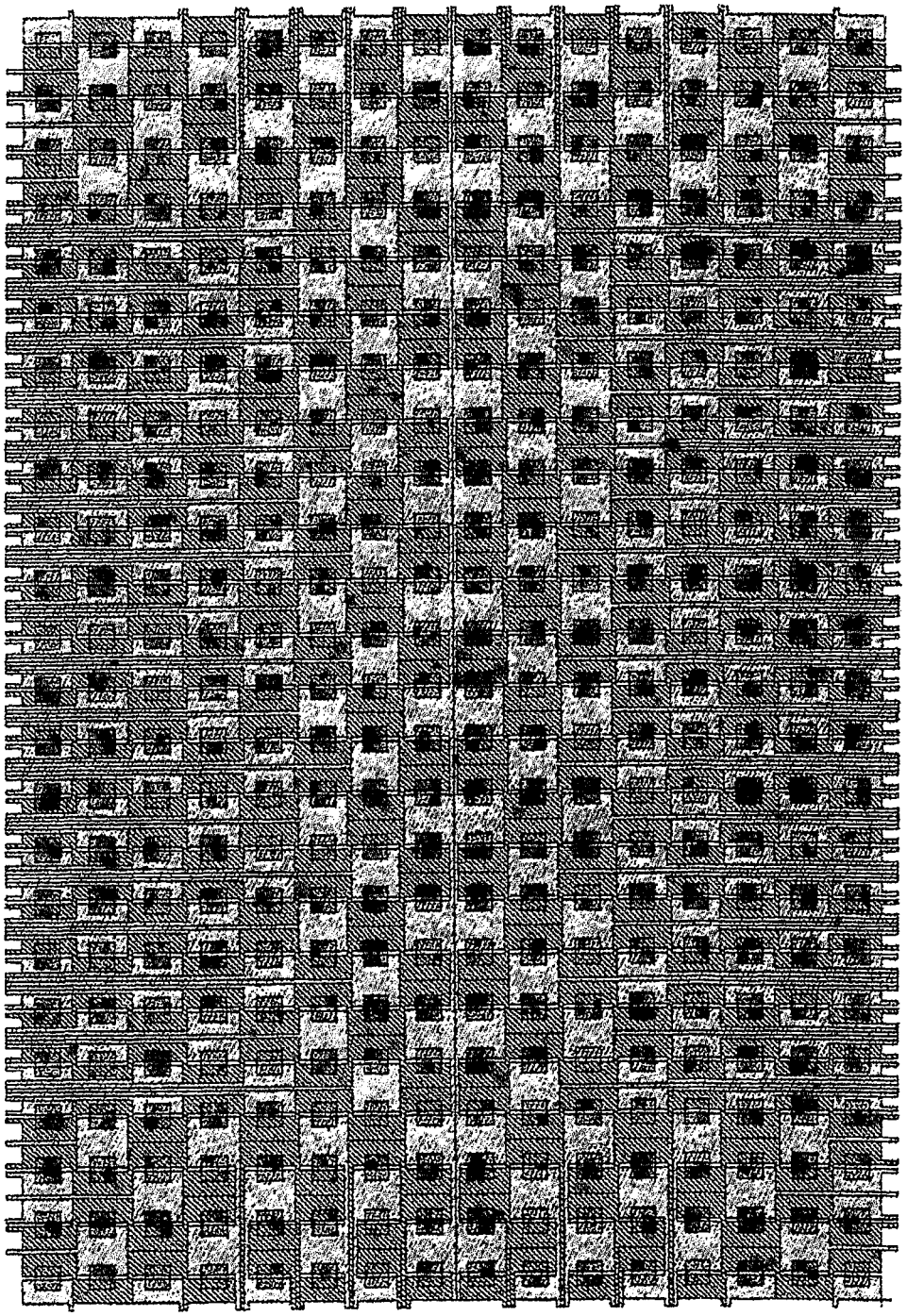

FIGS. 11b to 11d show corresponding representations of an embodiment of a layer electrode with 25×16 pixels.

Figure 12A:
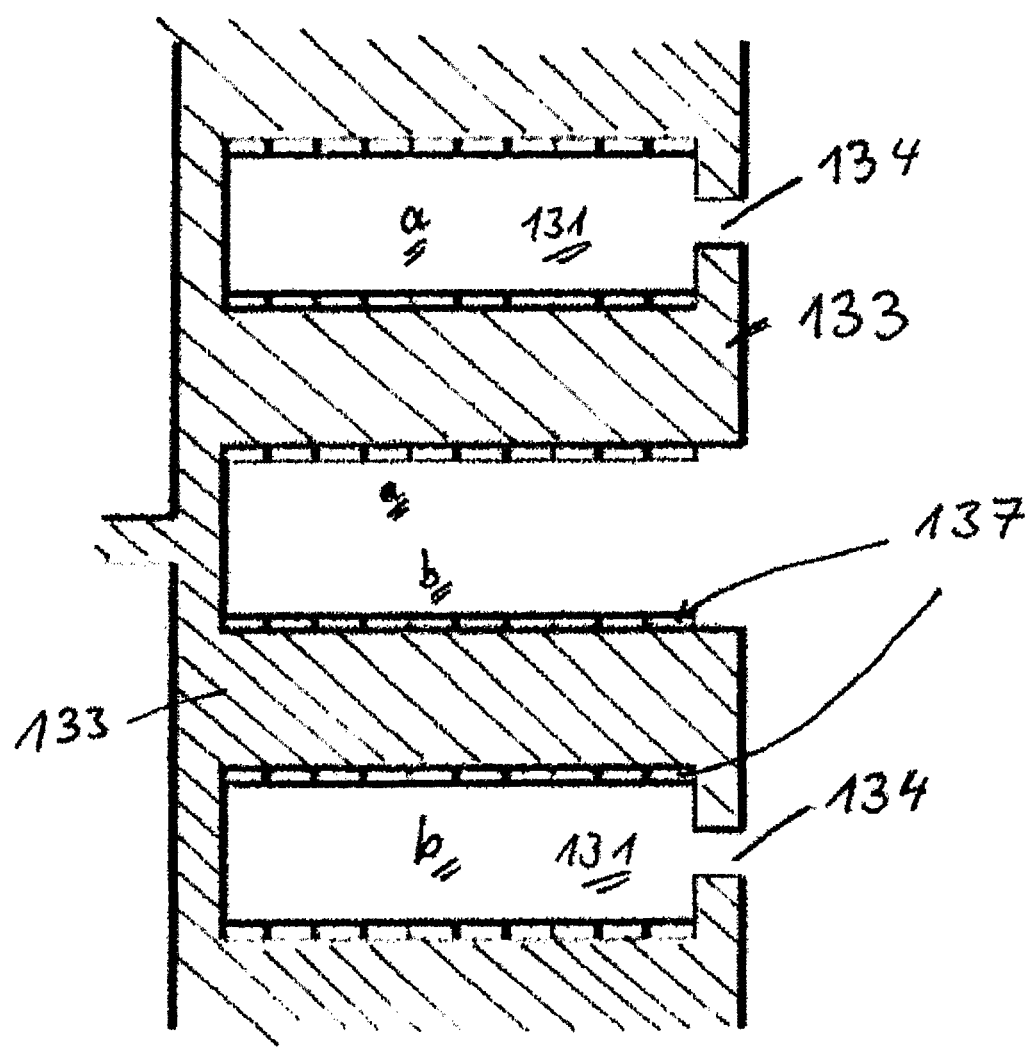
Figure 12B:
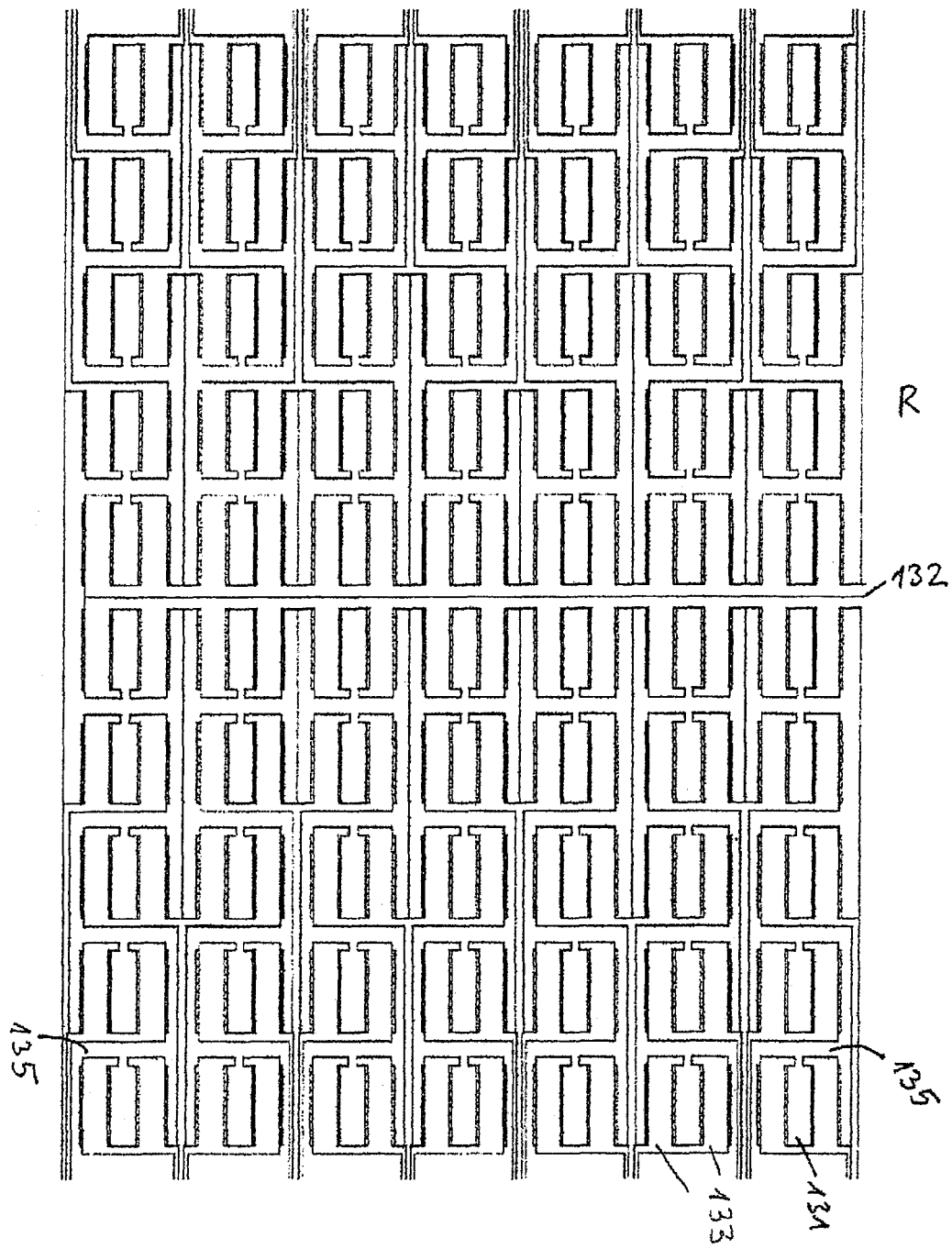

FIG. 12a shows an embodiment in which the receiver electrode array surface are designed as a rectangle via a bar and are connected to the supply line and FIG. 12b shows a matrix with the receiver electrode surfaces from FIG. 12a and corresponding transmitter electrode surfaces, which together form a matrix of 7×10.

Figure 1:
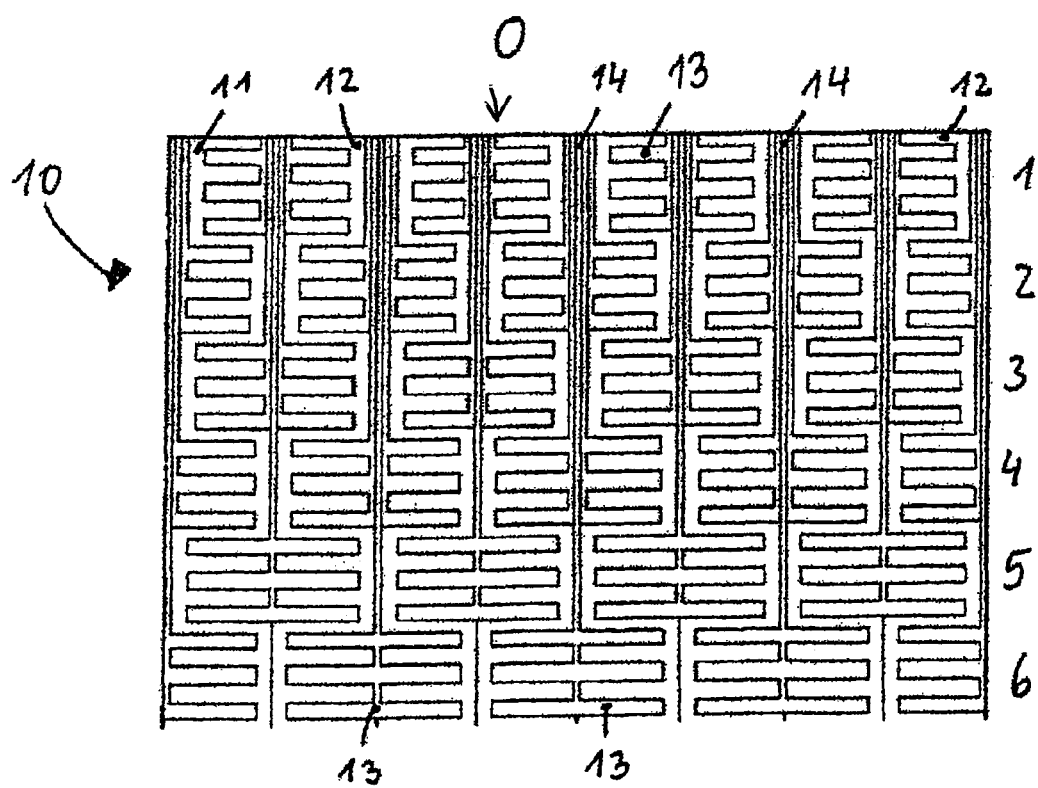
FIG. 1 shows the state of the art according to DE 10 2012 112 445.0.

FIG. 1 shows the regular structure of a layer electrode 10 according to the state of the art. Receiver electrodes 11 and 12, which are formed in a meandering shape, and transmitter electrodes 13, which likewise mesh with the receiver electrodes 11 and 12 in a meandering shape, can be seen. Here by way of example the upper half 10 of a layer electrode is shown which adjoins the other half (not shown) via a row 6.

In FIG. 1 it can be seen how supply lines 14 lead from the center of the layer electrode, for example row 6, out to a side O (the top). The ratio of active surface, i.e. covered with electrode array, to inactive surface, i.e. covered with supply lines, reduces successively from row 6 to row 1, where this ratio is smallest and correspondingly the input signals are weakest. The interfering signals are strongest here.

A problem is that the signals triggered by a touch in the edge regions, i.e. for example along row 1, are weaker than the signals of rows 5 and 6 because the transmitter electrodes 13 of rows 2 and 3 are isolated by a bundle of supply lines 14 and smaller electrode surfaces are available than in rows 5 and 6.

Figure 2A:
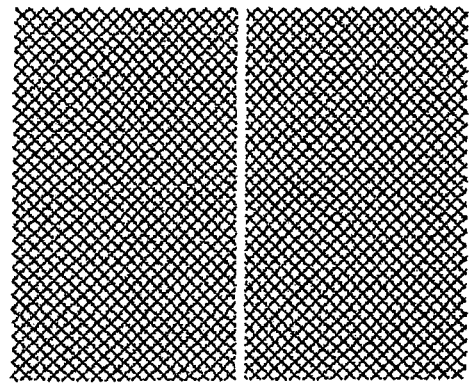
FIG. 2 shows examples for the design of the galvanic isolation of the electrode arrays and/or supply lines from each other.
Figure 2B:
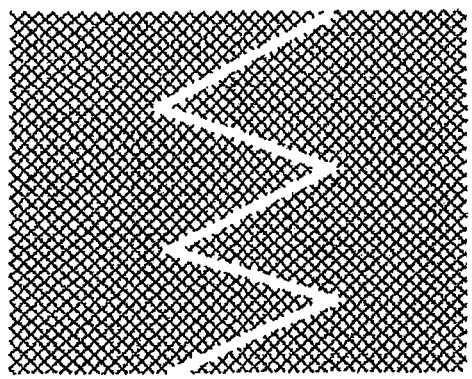
Figure 2C:
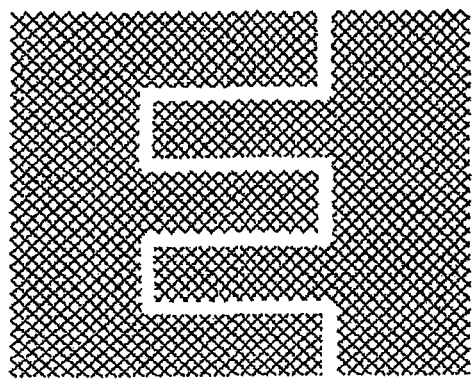

FIGS. 2a to 2c show a detailed view from one of FIGS. 3 to 11, wherein the possible galvanic isolations between the electrode arrays and/or the supply lines are shown. Two conductive regions on the layer electrode which adjoin each other can be realized for example according to the patterns 2a to 2c shown here.

In particular, the galvanically isolating slits either have a meandering shape, a zigzag shape or are rectilinear and are wide enough that a short circuit can be avoided. The width of these slits is in the range of from 20 µm to 1 mm, in order that a covering of the touchscreen can be realized with a thickness or height of 1 mm to 6 mm. In particular, widths of the slits of 175 µm to 500 µm are used here, preferably a width of 200 to 300 µm.

In FIG. 3 the layer electrode 30 can be seen which comprises a pixel matrix, as shown in FIG. 3a, of 4×6 input fields. The pixel matrix is only symbolic and is intended to illustrate that associated position signals can be allocated to particular geometric locations. Accordingly, the virtual pixel matrix 31 of FIG. 3a is also symbolically superposed in FIG. 3d without real and representational fields corresponding to the fields of the pixel matrix 31. Rather, the pixels are formed by the intersections of the columns and rows of the real electrodes of FIGS. 3b and 3c and symbolized by means of the representation of FIG. 3a. In FIG. 3b only the distribution of the receiver electrode arrays a and b can be seen, which in each case are galvanically connected to each other in the form of columns and to the supply lines 32 or 33. In this FIG. 3b and in all further figures marked with "b"

the transmitter electrode arrays are omitted for reasons of clarity, as is the case in FIG. 3c and in all further figures labeled with "c" for the receiver electrode arrays.

In FIG. 3b the galvanic isolation of the receiver electrode arrays a and b with respect to the adjacent receiver electrode arrays b and a can be seen along the dashed line. For reasons of simplicity, the line is shown straight but in detail can be designed as shown in FIG. 2. The isolation effects, as stated, a galvanic isolation and the surface of the layer electrode covered by it is not available as an input element. For completion of the layer electrode 50, the two halves 30 and 40 are placed against each other. By means of the transmitter electrode arrays c and d, which produce a transmitter electrode array row c and d respectively, as shown in FIGS. 3c, 4c and 5c, it can be seen how the cut-outs of the layer electrode shown in FIGS. 3c and 4c are assembled, in order that the layer electrode shown in FIG. 5c is formed. Thus, in the representation shown, the respective supply lines 32 and 33 for the columns can be seen at edge O of the layer electrode 30, which columns, after completion, are contacted towards the top, towards side O.

In FIG. 3c, the subdivision of the transmitter electrode arrays 1, 2, 3 and c can be seen which are in each case assembled to form a row. The supply lines 34, 35, 36 belong to the transmitter electrode arrays of rows 3 and 1 and 2 respectively. The supply lines 34, 35 and 36 lead towards side O.

The transmitter electrode arrays 2 lie within row 2, the transmitter electrode arrays 3 lie within row 3 and the transmitter electrode arrays 1 lie within row 1.

FIG. 3b shows the corresponding receiver electrode arrays a and b which are each connected to each other galvanically within a column. It is likewise shown in FIG. 3b how the supply lines 32, 33 of the receiver electrodes from FIG. 3b lead towards side O.

This also corresponds to the known supply lines according to the state of the art. In contrast to this, the supply lines 37, shown in FIG. 3c, for the transmitter electrode arrays c are not guided parallel to the other supply lines but at right angles thereto. In particular, it can be easily seen how the supply lines 32, 33, 34, 35 and 36 are at right angles to the supply line 37 of the transmitter electrode arrays c and the supply line 37 leads towards side L.

The density of the supply lines which lead towards side O is thus reduced. The result is 3 rows of transmitter electrode arrays which are all undivided because the supply lines 34, 35 and 36 only cut through the outermost, i.e. here the transmitter electrode arrays 1 of row 1 towards side O. The transmitter electrode arrays according to FIG. 3c are thus either not cut through at all by the supply lines or are only cut through once and a signal triggered there is therefore only minimally weakened, corresponding to the signal of row 5 from FIG. 1, which shows the state of the art.

The layer electrode 30, assembled from all of the individually shown electrode arrays from FIGS. 3a to 3c, can be seen in FIG. 3d. The supply lines 32 to 36 can be seen on side O, wherein the supply lines 34 cut the transmitter electrode arrays 1 of the outermost row in half. The signals triggered on the corresponding matrix pixels may still be weakened compared with the signals triggered in row 2, 3 or c, but much less than in the corresponding rows in FIG. 1. The side U is not shown here since a layer electrode is in principle assembled from two layer electrode halves, for example 30 and 40, which adjoin each other via side H.

FIGS. 4a to 4d show corresponding representations of the other half 40 of the layer electrode with 8×6 pixels, which, together with the one shown in FIG. 3, produce the layer electrode 50, comprising layer electrodes 30 and 40. FIG. 4a corresponds to FIG. 3a and shows the distribution of the pixels in a uniform rectangular matrix. FIG. 4b shows the receiver electrode distribution which connects to the receiver electrodes of FIG. 3b via the common side H. FIG. 4c again shows the transmitter electrodes which are arranged in rows, wherein, analogously to FIG. 3c, the transmitter electrode arrays d of the uppermost row d has supply lines 47 which are at right angles to the supply lines of rows 1 to 3. FIG. 4d again shows an aggregation of FIGS. 4a to 4c as layer electrode 40.

FIG. 5 shows the entire layer electrode 50 assembled from the two halves shown in FIGS. 3 and 4. FIG. 5a reproduces the pixel matrix with 6×8 pixels, FIG. 5b shows the receiver electrode array distribution corresponding to a merging of the two FIGS. 3b and 4b, and FIG. 5c shows the transmitter electrode array distribution in which the two rows c and d adjoin each other on the face. These two transmitter electrode array rows c and d have supply lines 37 and 47 which are at right angles to the supply lines 14, 32, 33, 34, 35, 36, 44, 45, 46 from those of the transmitter electrode arrays of rows 1 to 3.

In FIGS. 5b, 5c and 5d it can be seen that the layer electrode 50 comprises the two halves 30 and 40, wherein the two halves are constructed identically in relation to the coverage with electrode arrays, i.e. receiver and transmitter electrode arrays, supply lines and galvanic isolations, but are offset by half a transmitter and/or receiver electrode array surface.

FIG. 5d shows the layer electrode 50 with references for the sides O, U, R and L for top, bottom, left and right.

FIGS. 6a to 6d show an extension to a matrix 60 with 6×7 pixels with the corresponding representation of the receiver electrode array distribution in FIG. 6b and the transmitter electrode array distribution in FIG. 6c. Unlike in the previous FIGS. 3 and 4, the individual electrode arrays are not written on here but the corresponding allocations are indicated at the edge of the rows and columns.

In FIG. 6c it can again be seen that here the supply lines 67 of the uppermost row e of the transmitter electrode arrays is effected towards the sides L and R. The supply lines for the transmitter electrode arrays of rows 1 to 5 are effected to side U, whereas the supply line of the transmitter electrode arrays of row e is effected at right angles thereto towards the sides R and L.

Figure 7C:
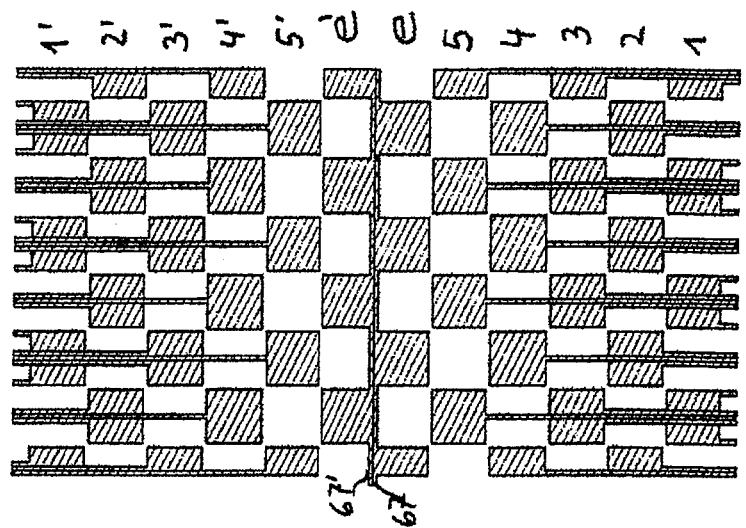
Figure 7B:
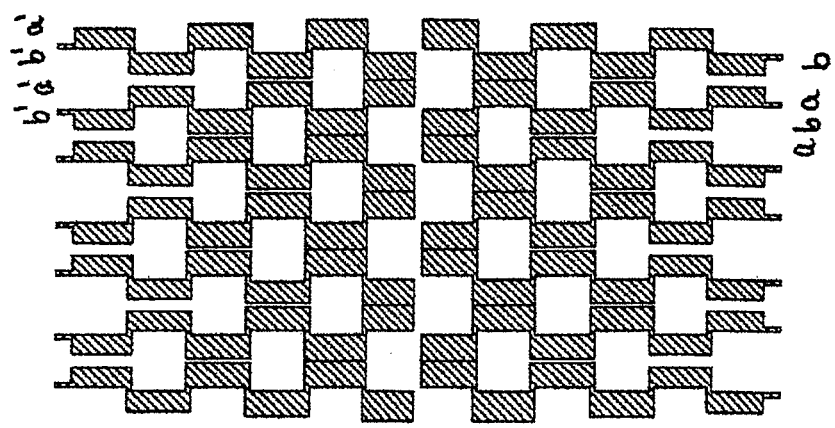
Figure 7A:
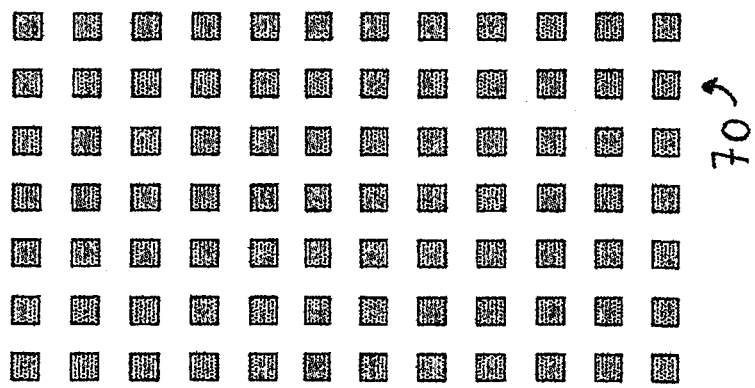
Figure 7D:
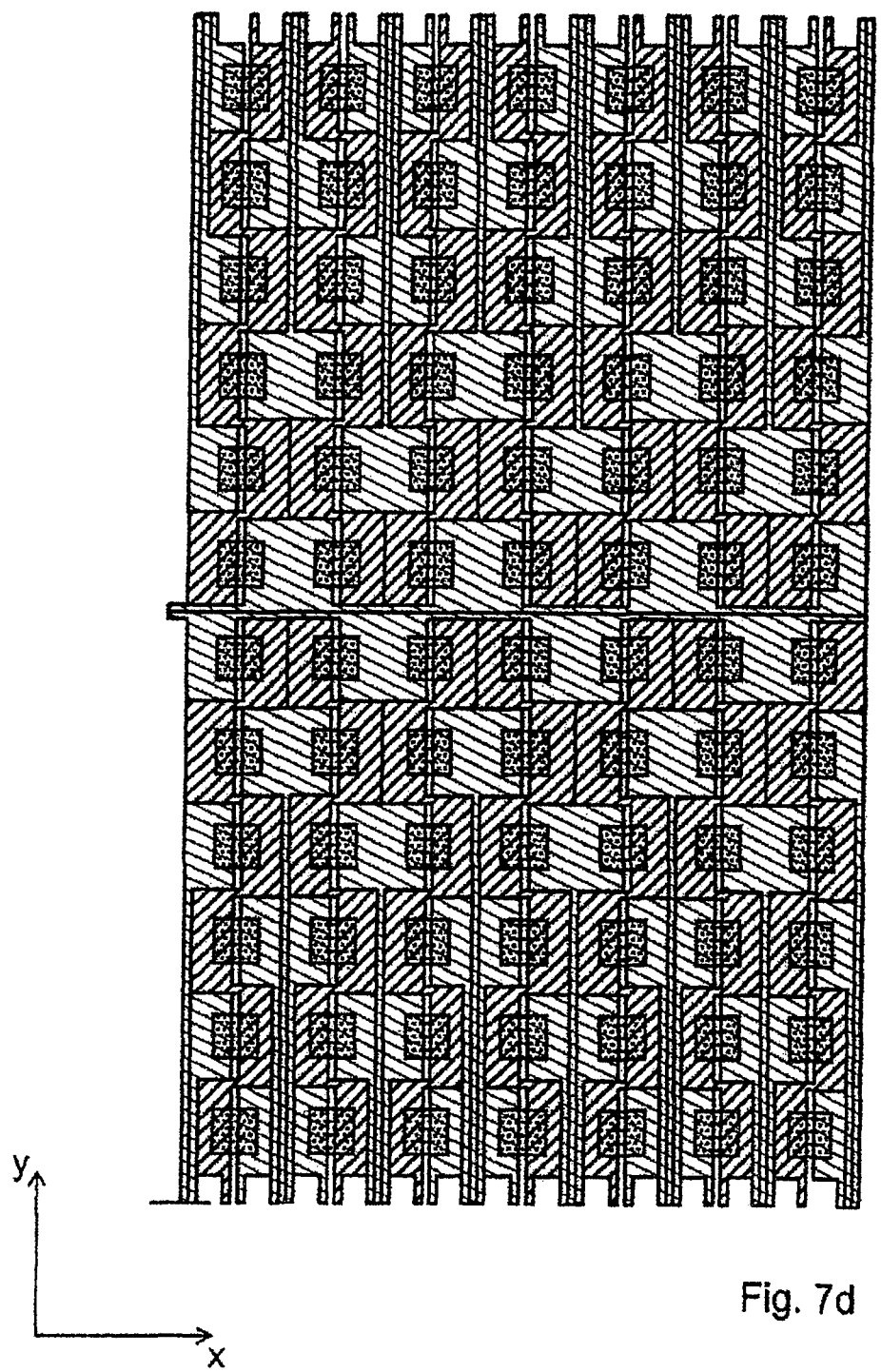

FIGS. 7a to 7d show the combination of two layer electrode halves as shown in FIGS. 6a to 6d to form a single layer electrode 70 with a pixel matrix of 12×7 fields. FIG. 7c shows the combination of two rows e and e' with transmitter electrode arrays, the supply lines 67 and 67' of which run to the sides R and L. Again, comparable to FIG. 5c, the layer electrode 70 is constructed of two halves, wherein the two halves adjoin each other along the line of the supply lines 67 and 67' identically in relation to the coverage with electrode arrays, i.e. receiver and transmitter electrode arrays, supply lines and galvanic isolations, but offset by half a transmitter and/or receiver electrode array surface.

FIGS. 8a to 8d again show an extension to a 6×8 pixel matrix.

Figure 8A:
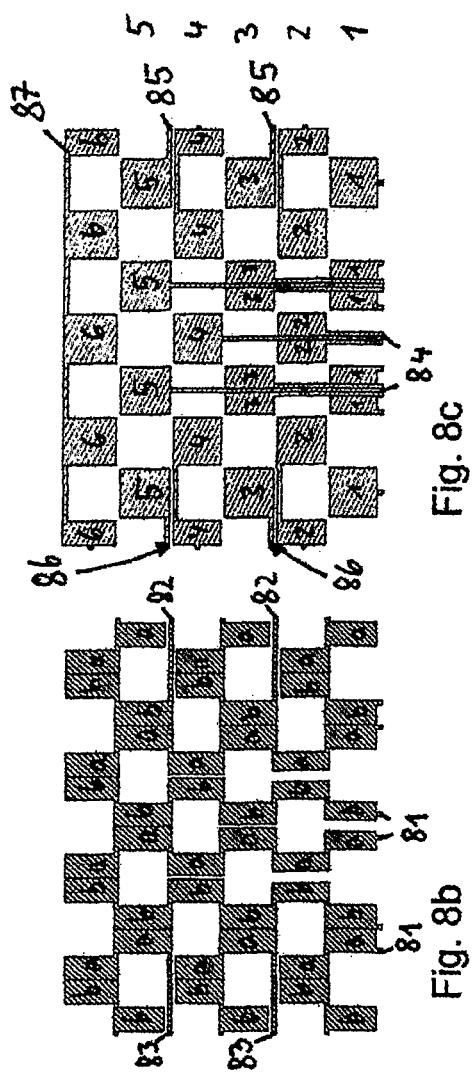
Figure 8B:
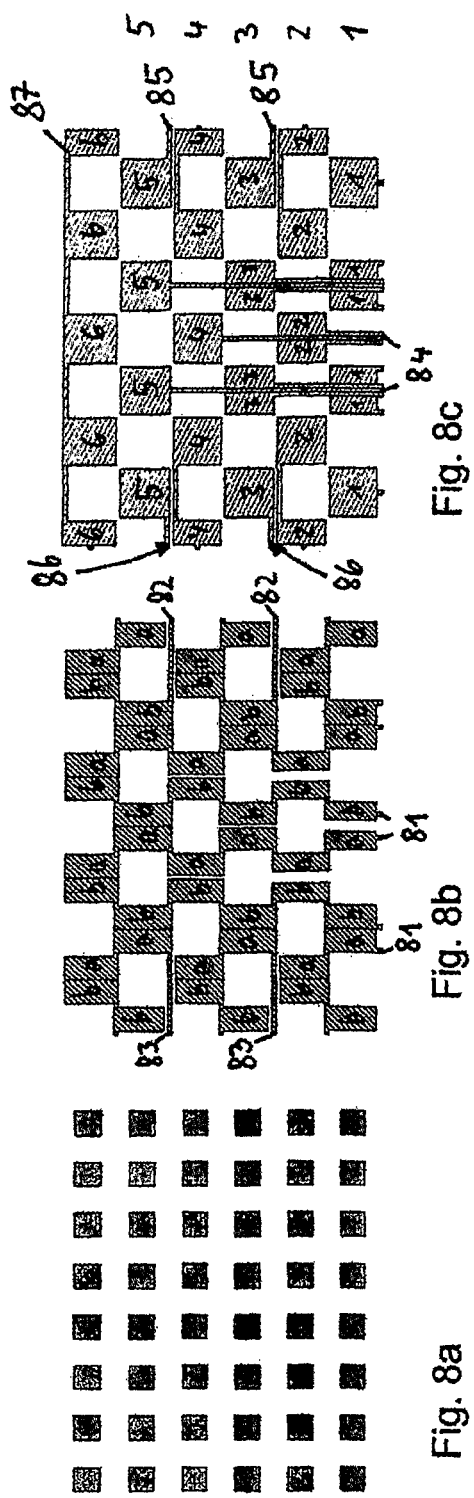

In FIG. 8b it is shown for the first time not only that the supply lines from transmitter electrode arrays of a row can be arranged at right angles to each other, but how the supply lines from receiver electrode arrays are arranged at right angles to each other.

According to FIG. 8b, the supply lines 81 go downwards, towards side U, the supply lines 82 go towards the right to side R and the supply lines 83 go towards the left to side L.

Figure 8C:
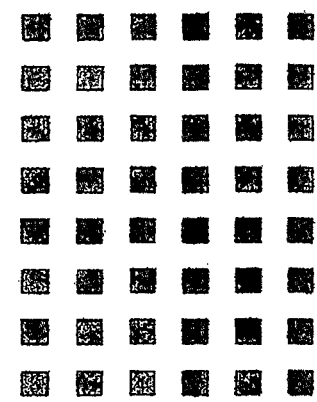
Figure 8D:
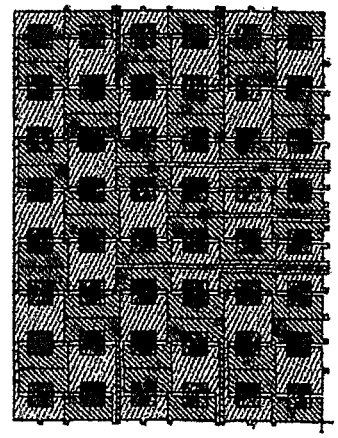

In FIG. 8c it can be seen that, in this extension of the matrix, some of the supply lines from the transmitter electrode arrays of rows 2, 3 and 4 within a row are at right angles to each other since the supply lines 84 of the inner transmitter electrode arrays of a row run downwards or upwards, i.e. towards the sides U or O, and the supply lines 85 of the outer transmitter electrode arrays of the right-hand side are effected to the right, i.e. to the side R, while the supply lines 86 of the outer transmitter electrode arrays of the same row of the left-hand side run towards the left, i.e. to the side L. Within the row uppermost in this representation 8c, the supply lines 87 run over the entire transmitter electrode row to sides R and L equally.

FIG. 8d again shows a superposed representation of FIGS. 8a to 8c which shows the entire structure of the layer electrode half of the 6×8 matrix.

Figure 9C:
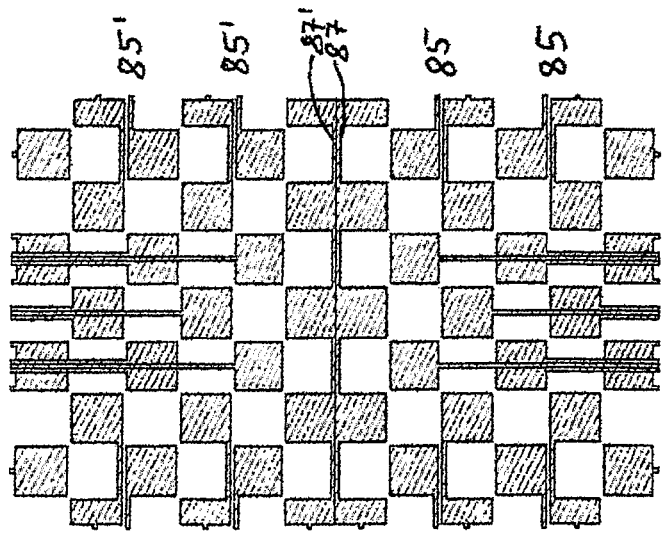
Figure 9B:
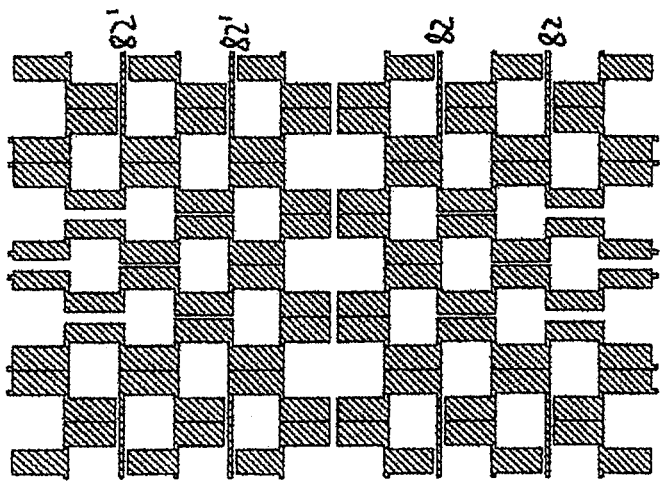
Figure 9A:
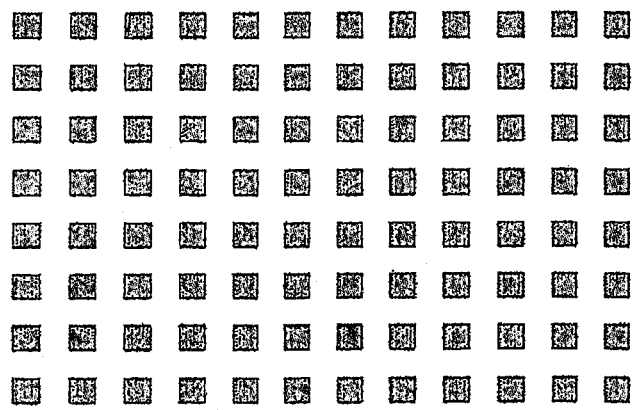
Figure 9D:
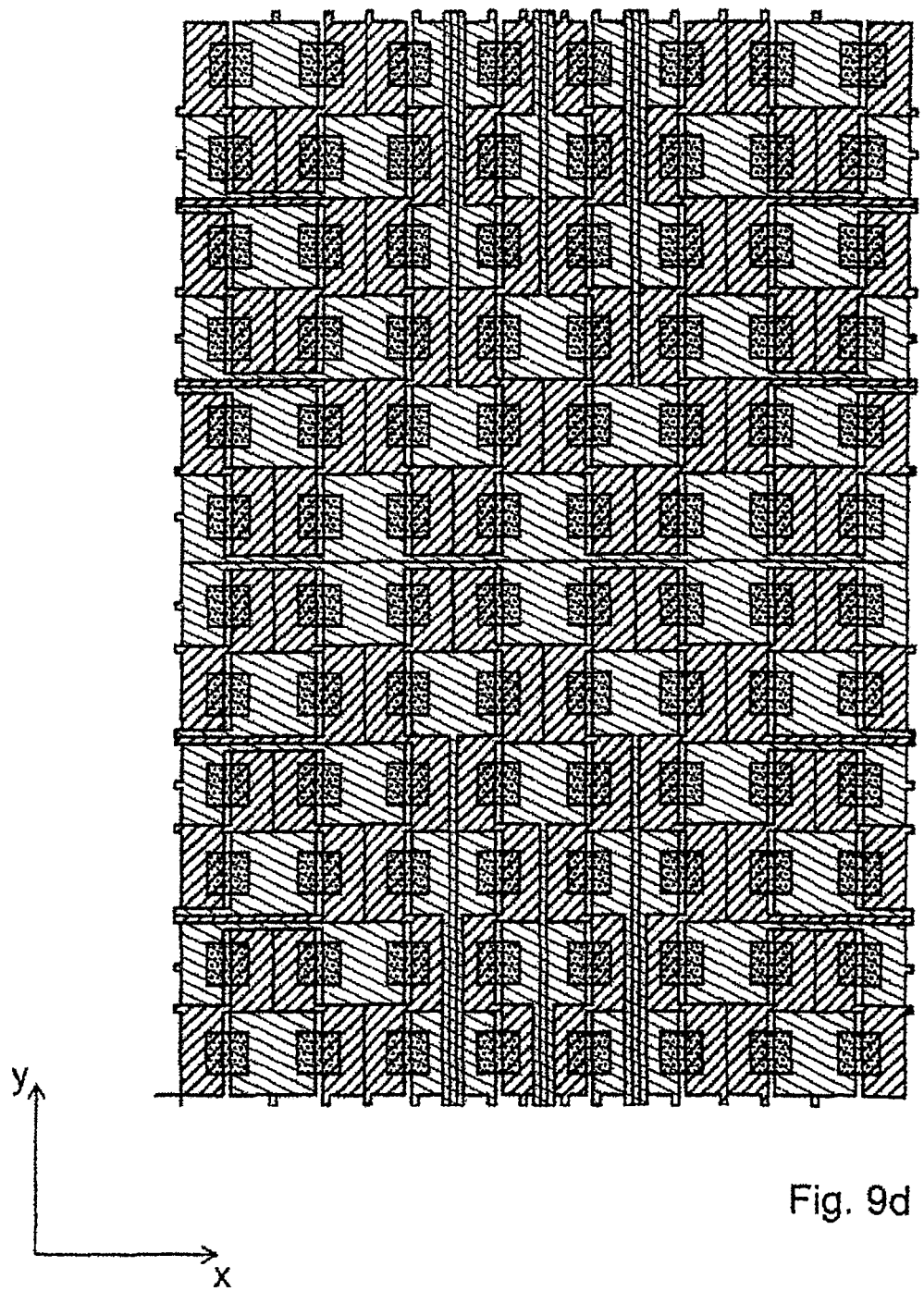

FIG. 9 shows the layer electrode 9d, constructed of both halves represented by means of FIG. 8, which is constructed of the matrix 90 with 8×12 pixels according to FIG. 9a. The receiver electrode array distribution according to FIG. 9b with the supply lines 82 running towards the sides R and L and the transmitter electrode array distribution according to FIG. 9c with the supply lines 85 running towards the sides R and L can be seen.

FIGS. 10b to 10d show the extension of the schema known from FIGS. 3 to 9 to a 10×16 matrix. In FIG. 10b it can be seen how the galvanic coupling is removed within a column of receiver electrode arrays and the supply lines 101 to 106 contact a column, wherein for example the supply line 101 of column a is at right angles to the supply lines 102 and 103 of the same column a. The situation is the same for the supply lines which can be seen in FIG. 10c, where again supply lines of a row of transmitter electrode arrays are arranged at right angles to each other, as is known from FIG. 8c.

In FIG. 10d a view comparable to FIGS. 3d to 9d is shown again, wherein pixel matrix, receiver electrode array distribution, transmitter electrode distribution and supply lines can be seen.

FIGS. 11b to 11d show the extension of the system to a 16×25 matrix.

FIGS. 12a and 12b show another embodiment, in particular with respect to the design and shape of the individual transmitter and receiver electrode arrays. Here at least some of the electrode array surfaces are designed in the shape of right-angled polygons 131, which are connected via a bar 134 to a connecting line 135. Here, a receiver electrode array a or b as a right-angled quadrilateral 131 is linked via a bar 134 to the closest receiver electrode array of the same column, whereas the transmitter electrode arrays 133 cover the surface around the receiver electrode, as shown by the hatching. The transmitter and receiver electrode arrays are isolated from each other by spacings 137 which form galvanic isolations. In the embodiment the transmitter electrode array surface 133 (hatching) corresponds to the surface which is not covered by the receiver electrode arrays 131, 134, supply lines and/or galvanic isolations 137.

FIG. 12a shows the structure of a layer electrode with this type of electrode array, wherein a supply line 132 is guided outwards towards the right, while other supply lines are guided upwards and downwards.

By means of the invention an arrangement of supply lines is put forward for the first time within an enlarged pixel matrix, by means of which the outer electrode arrays remain as large as possible since only a few supply lines are guided through it.

The invention relates to a layer electrode for touchscreens, in particular one which is suitable for the construction of capacitive touchscreens. With a growing number of pixels within the layer electrode, various possibilities are proposed for reducing the loss of surface area within an outer electrode array due to the passage of supply lines to inner electrode arrays. For this, solutions are indicated to change the shape of the electrode arrays, the shape of the galvanic isolations between the electrode arrays and finally the arrangement of the supply lines for the electrode arrays in such a way that the signals of the outer electrode arrays retain a comparable strength to the signals of the inner electrode arrays.

The invention claimed is:

1. Layer electrode for a touchscreen, comprising:
a layer electrode having four corners and correspondingly four sides,
wherein each of two sides of the four sides lie opposite each other and thereby within the layer electrode, and in each case, predetermine parallel rows and columns for two opposite sides,
wherein the layer electrode has a usable surface, which is divided into an active surface covered with a plurality of electrode arrays arranged in rows and columns, and an inactive surface covered with 1) electrical supply lines or 2) galvanic isolations between the plurality of electrode arrays or the electrical supply lines,
wherein the ratio of active to inactive surface areas in the edge region in the outermost columns and in the outermost rows of the edge region, is at least 1, and the arrangement of the plurality of electrode arrays, the electrical supply lines or the galvanic isolations is chosen such that, in addition to an ohmic contacting of certain of the electrical supply lines with certain of said plurality of electrode arrays on one side of each of the corresponding electrode of the plurality of electrode arrays, there is ohmic contacting of further supply lines of said electrical supply lines with further of said plurality of electrode arrays on two further sides of the layer electrode,
wherein transmitter electrode arrays of a first a type, seen from a first side of the layer electrode, lie on the usable surface further in from the first side of the layer electrode towards a central region of the layer electrode, which array have a first portion of said electrical supply lines which run such that transmitter electrodes of a second type lying further out from a corresponding side of the layer electrode are divided into two transmitter electrodes galvanically isolated from each other that extend across the entire active surface, wherein these galvanically isolated second type of transmitter electrodes are connected separately via a second portion of said electrical supply lines, wherein the first and the second portions of said electrical supply lines run collinearly to each other and as a bundle, and characterized by the second type of transmitter electrodes, which, seen form the first side, lie further in from the first side than all of the transmitter electrodes of the first type and which have a third portion of said electrical supply lines which run perpendicular to the first and second portions of said electrical supply lines or bundles of electrical supply lines, and characterized by receiver electrodes, which, without having electrical supply lines, are formed in columns, and wherein these columns run substantially parallel to the first and second portions of said electrical supply lines;

wherein at least one row or column of the electrode arrays is provided, within which their corresponding electrical supply lines are at right angles to each other;

wherein the layer electrode is arranged as a touch sensor with an electrically conductive layer, in which the electrode arrays are formed as both receiver and transmitter electrode arrays;

wherein the electrode arrays are transparent and are arranged on a transparent film, and wherein the electrode arrays are metallic conductor traces;

wherein the transmitter electrode array cover surfaces in the active area which are not covered by the receiver electrode arrays, the electrical supply lines and galvanic isolations;

wherein the receiver electrode array and the transmitter electrode array are separated only by galvanic isolation;

wherein the layer electrode comprises two halves that each comprise one of the two second type of transmitter electrodes, and the two halves are constructed similarly in relation to the coverage with electrode arrays comprising receiver and transmitter electrode arrays, the wiring of the electrical supply lines, and the galvanic isolations, but are offset by half a transmitter and/or receiver electrode array.

2. Layer electrode according to claim 1, wherein the touchscreen comprises a matrix of one of 7×6 pixels, 8×6 pixels, 7×12 pixels, 8×12 pixels or 10×16 pixels.

3. Layer electrode according to claim 1, wherein the electrical supply lines run parallel to electrode arrays and at right angles to each other.

4. Layer electrode according to claim 1, in which the two halves in each case have at least two rows and/or columns of transmitter and/or receiver electrodes, and the corresponding ones of the electrical supply lines of the rows and columns are at right angles to each other.

5. Layer electrode according to claim 1, wherein the two halves adjoin each other in such a way that their corresponding electrical supply lines adjoining each other run in parallel.

6. Layer electrode according to claim 1, wherein the electrical supply lines for the electrode arrays on all four sides of the layer electrode extend towards the outside of the layer electrode.

7. Layer electrode according to claim 1, wherein the electrical supply lines are bundled on two sides and on two sides individually extend from the electrode arrays towards the outside of the layer electrode.

8. Layer electrode according to claim 1, wherein the electrode arrays each have a surface in which the galvanic isolation of the electrode array surfaces runs in one of a rectilinear, a zigzag pattern and/or in a meandering shape.

9. Layer electrode according to claim 1, wherein the electrode arrays comprise receiver and transmitter electrode arrays having respective surfaces, wherein the transmitter and/or receiver electrode array surfaces are constructed as polygons.

10. Layer electrode according to claim 9, in which the transmitter and/or receiver electrode array surfaces are constructed one of rectangular, or square.

11. Layer electrode according to claim 1, wherein the electrode arrays comprise receiver and transmitter electrode arrays in which the transmitter and/or receiver electrode arrays are constructed as irregular polygons.

12. Layer electrode according to claim 1, wherein the electrode arrays comprise receiver and transmitter electrode arrays having respective surfaces in which at least some of the electrode array surfaces are designed in the shape of right-angled polygons, which are connected via a bar to a connecting line.

13. Layer electrode according to claim 1, in which the ratio of active to inactive surface areas in the edge region in the outermost columns and in the outermost rows is in the range of from 1.5:1 to 4:1.

14. Layer electrode according to claim 1, wherein the electrode arrays comprise receiver and transmitter electrode arrays having respective surfaces wherein at least some of the electrical supply lines of the receiver and/or transmitter electrode surfaces of the layer electrode lying inside the usable surface of the layer electrode are displaced such that the supply lines are displaced in each case along the shortest route between the position of the respective electrode arrays and the closest side of a usable surface of the layer electrode.

* * * * *